(12) United States Patent
Quetel et al.

(10) Patent No.: US 8,647,101 B2
(45) Date of Patent: Feb. 11, 2014

(54) INSTALLATION FOR THE PRODUCTION OF CONTAINERS, COMPRISING A RETRACTABLE TRANSFER WHEEL

(75) Inventors: Francois Quetel, Octeville sur Mer (FR); Jerome Demare, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 290 days.

(21) Appl. No.: 13/139,371

(22) PCT Filed: Jan. 7, 2010

(86) PCT No.: PCT/EP2010/050105
§ 371 (c)(1),
(2), (4) Date: Jun. 13, 2011

(87) PCT Pub. No.: WO2010/081759
PCT Pub. Date: Jul. 22, 2010

(65) Prior Publication Data
US 2011/0250307 A1 Oct. 13, 2011

(30) Foreign Application Priority Data

Jan. 13, 2009 (FR) ...................................... 09 50154

(51) Int. Cl.
*B29C 49/42* (2006.01)
(52) U.S. Cl.
USPC ........................................................ 425/150
(58) Field of Classification Search
CPC .................... B29C 49/421; B29C 2049/4697; B65G 47/846; B67C 2003/227
USPC ........................................................ 425/150
See application file for complete search history.

(56) References Cited

U.S. PATENT DOCUMENTS 3,035,886 A * 5/1962 Hickey ............................ 422/27
7,938,639 B2 5/2011 Adriansens et al.

FOREIGN PATENT DOCUMENTS

| DE | 199 28 325 | 12/2000 |
| FR | 2 766 169 | 1/1999 |
| FR | 2 915 127 | 10/2008 |
| JP | 2003-502238 A | 1/2003 |

(Continued)

OTHER PUBLICATIONS

Japanese Office Action, dated Jan. 8, 2013, from corresponding Japanese application.

(Continued)

*Primary Examiner* — Yogendra Gupta
*Assistant Examiner* — Alison Hindenlang
(74) *Attorney, Agent, or Firm* — Young & Thompson

(57) ABSTRACT

An installation (10) for the production of containers (12), includes a wheel (30) for transferring containers respectively between a first chamber (14) having a blowing unit (16) and a second chamber (18) having a filling unit, the wheel (30) being mounted such that it can move between at least: —a transfer position in which the wheel extends through an opening (24) which is common to the chambers (14, 18) in order to transfer the containers (12), and —a retracted position in which the wheel is displaced in order to close the opening (24) by element of associated closure element (26) in order to decontaminate the second chamber (18), and in which the displacement of the transfer wheel (30) between the positions is controlled manually or automatically from outside the first chamber (14) and/or the second chamber (18) of the installation (10).

12 Claims, 10 Drawing Sheets

(56) References Cited

FOREIGN PATENT DOCUMENTS

| JP | 2003-146427 A | 5/2003 |
|---|---|---|
| JP | 2003-237936 A | 8/2003 |
| WO | 96/18541 | 6/1996 |
| WO | 98/47770 | 10/1998 |
| WO | 2006/136498 | 12/2006 |
| WO | 2008/049876 | 5/2008 |

OTHER PUBLICATIONS

International Search Report dated Apr. 23, 2010, in the corresponding PCT Application.

* cited by examiner

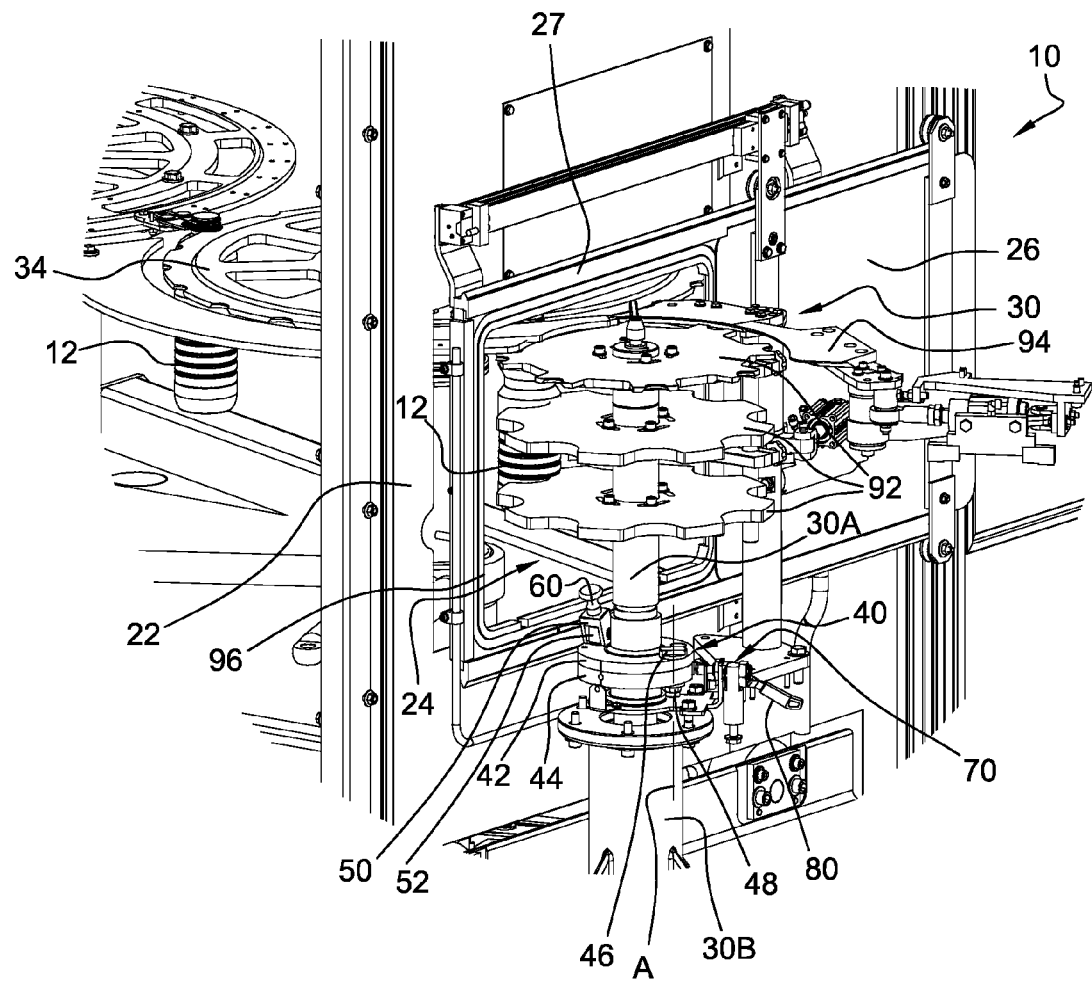
Fig. 6
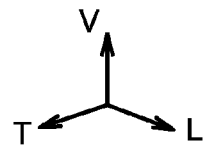

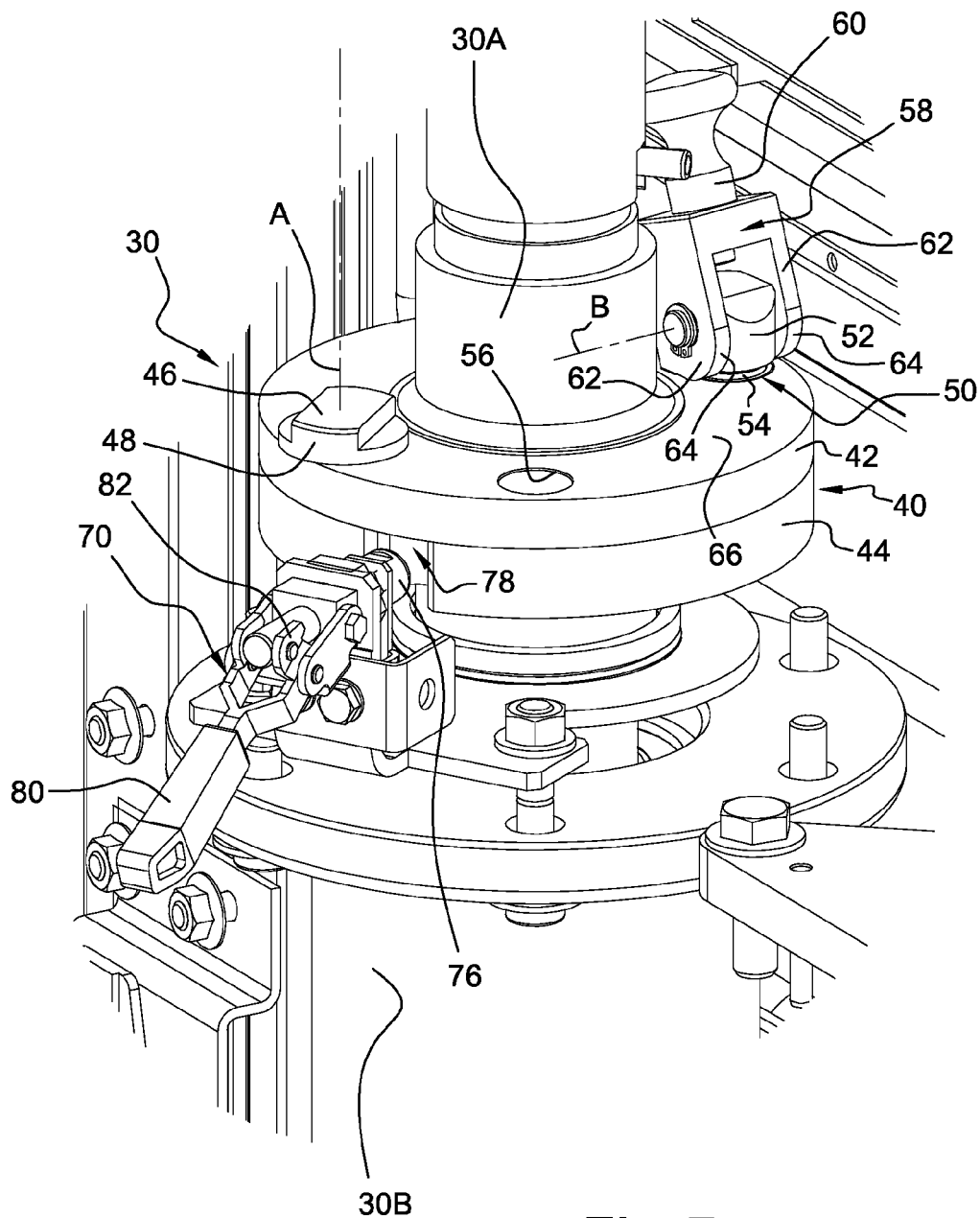
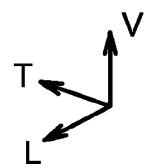
Fig. 7

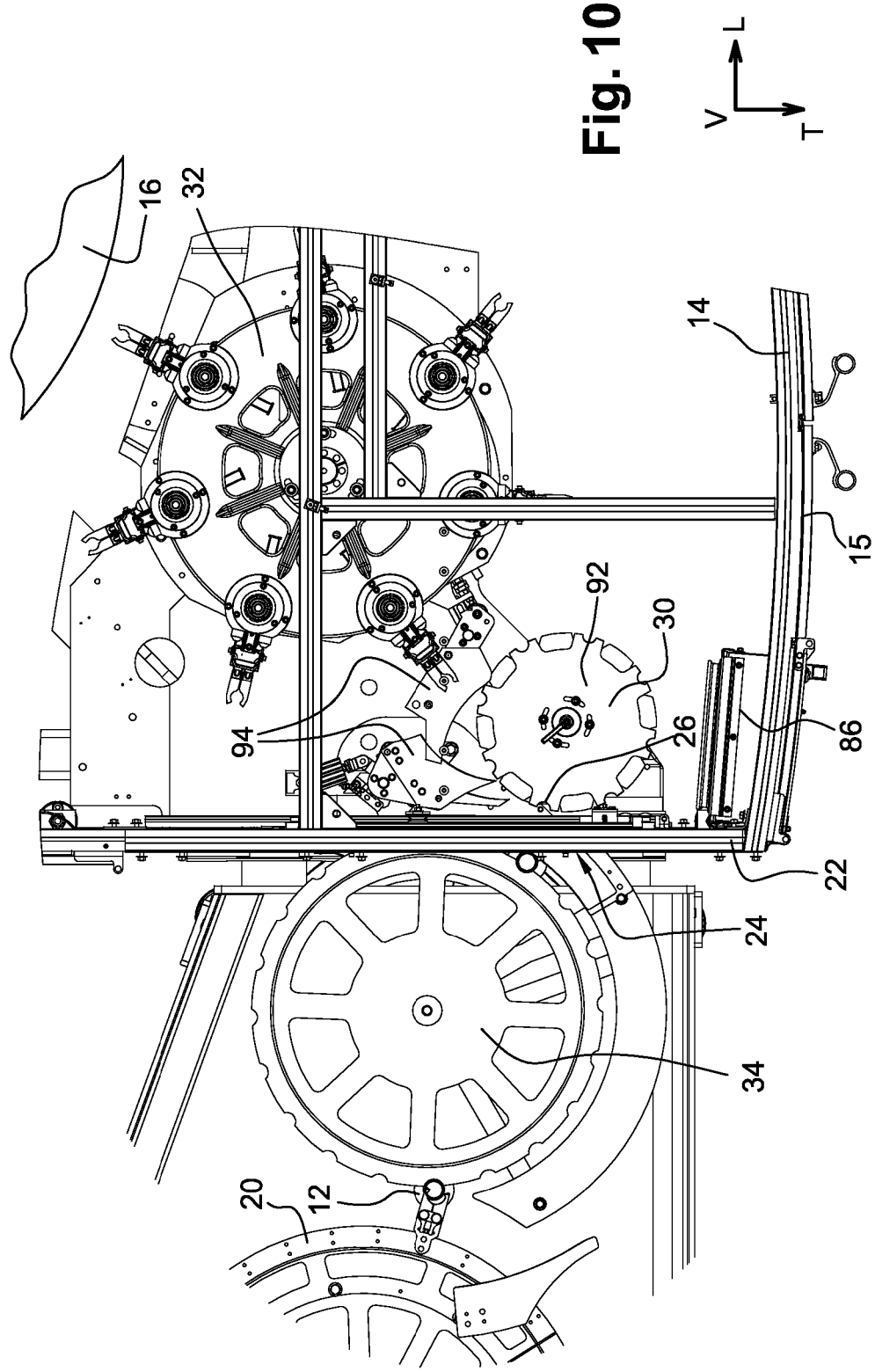

INSTALLATION FOR THE PRODUCTION OF CONTAINERS, COMPRISING A RETRACTABLE TRANSFER WHEEL

The invention concerns an installation for the production of containers, comprising a retractable transfer wheel.

The invention concerns more particularly an installation for the production of containers, notably bottles, including at least:

- a protective or first enclosure delimiting a first area inside which is placed at least one container blower unit,
- a confinement or second enclosure which at least in part adjoins the first enclosure via a common part and delimits a sterile second area inside which is placed at least one filler unit for filling the finished containers,
- at least one opening in said common part of said first and second enclosures adapted to allow the transfer of containers from the blower unit to the filler unit,
- means for shutting off said opening adapted to be moved selectively between an open position in which the shutting off means allow said transfer of containers through the common opening and a closed position in which the shutting off means prevent transfer by isolating the second enclosure in order to decontaminate the filler unit, and
- at least one transfer device including at least one transfer wheel adjacent said opening adapted to transfer containers between the blower unit and the filler unit.

Such an installation is used for example for the production of plastic material, notably PET (polyethylene terephthalate), bottles.

BACKGROUND OF THE INVENTION

In known manner, heat treatment of preforms in an oven is followed by transformation of the preforms into bottles in the blower unit, by shaping them by blowing or drawing-blowing in a mold, after which the containers are transferred to a filler and capping unit.

Thus the installation includes, upstream of the filler unit, a production unit preferably including a heat treatment oven and a blower unit.

The filler unit and the production unit, or at least the blower unit, are generally juxtaposed to obtain a unified production installation that is compact and carries out the whole of the production process, up to obtaining finished products.

In such a container production installation, the aim is to reduce by all means necessary the risk of contamination of the containers, which are likely to be filled with products that are more or less sensitive to such risks.

Consequently, it is known to carry out different actions whose only purpose is monitoring and controlling the microbiological quality of the production environment, i.e. eliminating pathogens such as germs, spores, bacteria, etc. that are liable to affect the content of the containers, notably to render them unfit for consumption.

To this end, these actions are not aimed exclusively at decontaminating the containers, but also at decontaminating the preforms from which they are produced and in general decontaminating the installation itself.

The prior art documents cited hereinafter, which should be referred to for more details, illustrate such actions by way of nonlimiting example only.

The document WO-2006/136498 for example describes decontaminating a preform by spraying a jet of sterilizing product vapor that is deposited by condensation on the internal wall of the preform, in the form of a substantially uniform film or mist of sterilizing product, in order to decontaminate said internal wall.

The document WO-2008/049876 also describes decontaminating the external wall of a preform during its heat treatment in an oven by the combined application of infrared radiation and ultraviolet radiation.

The document FR-2.915.127 describes an installation including a protective enclosure delimiting an area inside which is placed a container production unit including a blowing or drawing-blowing molding machined fed by transfer means with preforms previously heat treated in an oven, said installation including a system for blowing filtered air into the enclosure to establish therein an increased pressure in order to limit the risk of contamination of the performs, now containers, in the exit area of the oven.

Of course, these actions may be carried out simultaneously in the same installation to achieve a drastic reduction in the risk of contamination.

In the production process, the operation of filling the container is usually recognized as being the most sensitive in terms of the risk of contamination.

The containers introduced into the filler unit are merely one of the main vectors of contamination, however. As soon as they are present in the direct environment of the containers, from the air to the components of the installation, pathogens are liable in particular to contaminate the interior volume of the container.

This is why, over and above the sterilization and disinfection treatments aimed directly at the product intended to be introduced into the container and the container itself, the filler unit itself is also decontaminated, including a confinement enclosure adapted to isolate it from the surrounding atmosphere and to delimit an area to be sterilized and in which filling is carried out.

Such a filler unit is sometimes referred to as an isolator, a term which, by definition, generally designates any enclosure enabling operation to be carried out with no risk of contamination.

To the second area of the filler unit is sterilized by chemical decontamination, in particular by spraying sterilizing solutions such as sodium hydroxide (NaOH) or hydrogen peroxide ($H_2O_2$).

The decontamination of the second area of the filler unit corresponds to a decontamination mode of operation of the installation that precedes and/or succeeds a production mode of operation of the installation.

To be able to operate the filler unit in the decontamination mode, it is necessary to isolate the filler unit from the remainder of the installation and especially from the adjacent blower unit.

Although the components of the filler unit are produced in appropriate materials, such as 316L stainless steel, to resist the chemical aggression of the aforementioned decontamination solutions, this is not the case with those of the blower unit and the adjoining transfer device disposed between these units.

Thus the decontamination solutions are liable to cause undesirable chemical attack, notably corrosion of components of the transfer device and the blower unit, in particular the molds.

In such an installation, each unit therefore has its own enclosure, respectively a protective or first enclosure that delimits a first area in which at least the container blower unit is placed and a confinement or second enclosure that delimits a second sterile area in which at least a finished container filler unit is placed.

The second enclosure at least in part adjoins the first enclosure via a common interface part in which is provided an opening intended to enable transfer of the containers between said enclosures, from the blower unit to the filler unit, when the installation is operating in production mode.

To enable the filler unit to be isolated during operation of the installation in decontamination mode, the installation includes means for selectively shutting off said communication opening between the blower unit and the filler unit, such as a window through part of their respective enclosures.

The means for shutting off the opening are thus intended to be selectively displaced between an open position in which they allow said transfer of containers through the common opening when the installation is operating in production mode and a closed position in which they prevent such transfer, isolating the second enclosure, in particular to carry out the operations of treating the filler unit during operation in decontamination mode.

To transfer containers between the blower unit and the filler unit in production mode, the installation includes at least one transfer device including at least one transfer wheel.

Generally placed in the first area, the transfer wheel is adjacent said opening and has at least one part extending through the opening to transfer the containers. This part of the transfer wheel must be demounted beforehand to enable closing of the opening by the associated shutting off means.

The operation of demounting and then remounting at least part of the transfer wheel necessitates the intervention of an operator who, to carry out this operation, must enter the protection or first enclosure, which in particular is provided with doors for this purpose, in order to enter part of the first area, called the transfer area, in which is placed said transfer wheel that the operator must access to carry out said operations.

The operator carrying out such demounting and remounting operations is then a serious potential vector for the introduction of pathogens into the installation.

The demounting and/or remounting operations are thus particularly sensitive operations in that they carry a non-negligible risk of contaminating the protected working areas of the installation, which risks of contamination are of different orders.

Firstly, on entering the first enclosure from outside the installation in order to demount at least part of the transfer wheel, the operator is initially liable to introduce such pathogens into the first area, to be more precise into the transfer area.

Then, after sterilizing the second area of the filler unit in decontamination mode, the operator must again enter the first enclosure to remount at least said previously demounted part of the transfer wheel, and while doing this the operator is again likely to introduce pathogens into the first area.

The pathogens introduced by the operator into the installation the first time and likewise the second time may then immediately and/or subsequently contaminate all parts of the production unit and therefore the containers produced therein.

The pathogens introduced in this way are very particularly liable to contaminate the sterile second area by airborne transfer from the transfer area of the first part, as air circulates inside the areas delimited by the enclosures.

Consequently, it should be noted that the entry of the operator into the first area is generally speaking always prejudicial at least to the blower unit and that it occurs a first time on demounting part of the transfer wheel and/or a second time on remounting it.

Such introduction of pathogens at the same time as entry of the operator is liable to affect all actions carried out to prevent and in the case of some of them drastically to reduce the risk of contamination referred to above However, such introduction is equally and more importantly liable to affect the sterile environment of the second area of the filler unit, which then runs into multiple contamination risks.

A first risk of contaminating the filler unit occurs on demounting part of the transfer wheel if pathogens are introduced with the operator, because airborne pathogens may be transferred by the circulating air immediately and for as long as the opening is not shut off.

It will nevertheless be clear that such contamination does not appear critical if such pathogens are destroyed subsequently by the decontamination treatment.

A second risk of contamination of the filler unit occurs during the remounting operation, during which the common interface opening is again open; any pathogens introduced with the operator are then, in exactly the same way, liable to affect the sterile environment of the second area of the filler unit, and notably the containers that will subsequently be filled there in production mode.

Thus the most critical risks of contamination of the filler unit are more particularly, although not exclusively, those linked to the remounting operation if it follows on from decontamination of the second area.

Not exclusively in that pathogens introduced with the operator into the transfer area of the first area during demounting and/or remounting of part of the transfer wheel may also subsequently, and thus after the remounting operation, penetrate the sterile second area of the decontaminated filler unit.

Apart from the risk of effective contamination of the first area, there is then a potential risk of contamination of the sterile second area, simply because of the presence of such agents in the first area.

These pathogens are liable to contaminate the sterile second area either by airborne transfer in the air flowing through the opening or by being transported there by the containers themselves which, in production mode, travel from the first area to the second.

SUMMARY OF THE INVENTION

The object of the present invention is thus to improve such an installation, notably to reduce or eliminate the aforementioned risks of contamination.

To this end, the invention proposes an installation of the type described above, characterized in that at least part of the transfer wheel is mounted to be mobile between at least:
  a transfer or first position in which said at least one part of the wheel extends through the opening to transfer containers during operation of the installation in a production mode, and
  a retracted or second position in which said at least one part of the wheel is moved to allow closing of the opening by the associated shutting off means for operation of the installation in decontamination mode, and
  the movement of said mobile part of the transfer wheel between said transfer position and said retracted position is driven from outside the installation.

Movement of said mobile part of the transfer wheel between said positions is advantageously driven manually or remotely and automatically from outside the first enclosure and/or the second enclosure of the installation.

The invention eliminates the operations of demounting and remounting at least part of the transfer wheel that were previously necessary because, extending through the opening, said part of the wheel prevented closing thereof by the shutting off means. Closing the opening is required in particular to isolate the second enclosure from the first during decontamination.

The earlier demounting and remounting operations involving the presence of the operator in the transfer area of the first area are advantageously replaced by simple and rapid operations that, from outside the installation, pivot said at least one part of the transfer wheel and close the opening.

Thanks to this, the operator cannot at any time constitute a vector for introducing pathogens into the volume of the installation delimited by the enclosures, and so the aforementioned risks of contamination are eliminated.

Manually and/or automatically driven movement of the mobile part of the transfer wheel between said positions may be effected remotely, i.e. without an operator needing physically to enter the installation and thus, as before, to pass through the doors of the first enclosure to enter the transfer area of the first area in order to proceed there to the operations previously necessary of demounting and remounting part of the transfer wheel.

In the case of manually driven movement of the part of the transfer wheel, the presence of an operator is required, but the operator always carries out said operations from outside the installation, notably without ever entering the first area of the first enclosure, regardless of the operating mode of the installation in preparation.

Only one part of at least one of the arms of the operator preferably enters the first enclosure by means of a glove forming manipulator means joined in sealed manner to the enclosure so that the operator works remotely from outside the enclosure, being isolated from the components inside the installation that they manipulate or the surrounding air.

Thanks to this, and by comparison with the prior art, the operator is never in a position to constitute a vector for introducing pathogens into the installation.

According to other features of the invention:
- the transfer wheel includes a flange including at least an upper flange element and a lower flange element respectively fastened to an upper part and a lower part of the wheel, said flange elements being connected at least by articulation means adapted to allow movement between the transfer position and the retracted position of the upper part of the wheel forming said part mobile relative to the lower part of the wheel forming a fixed part;
- the articulation means consist of a pivot defining a pivot axis about which the upper flange element pivots relative to the lower flange element with a gyratory movement corresponding to the travel of the mobile upper part of the wheel between said transfer position and said retracted position;
- the transfer wheel includes locking means adapted to immobilize the upper part of the wheel relative to the lower part respectively in the transfer position and in the retracted position;
- the means for locking the wheel consist of at least one pin adapted to be introduced selectively into a first housing extending through the upper element and the lower element of the flange in which the pin immobilizes the upper part and the lower part of the wheel in a particular position corresponding to the transfer position or into a second housing extending through the upper element and the lower element of the flange in which the pin immobilizes the upper part and the lower part of the wheel in another particular position corresponding to the retracted position of the transfer wheel;
- the installation includes abutment means which are adapted to cooperate with part of the upper flange element to determine the position of the mobile upper part of the wheel in said retracted position, notably to facilitate introduction of the locking pin into the second housing;
- the transfer wheel includes immobilizing means adapted selectively to immobilize the fixed lower part of the wheel against rotation relative to the means for driving the transfer wheel in rotation when the installation is in decontamination mode;
- the rotation immobilizing means consist of at least one finger that is received in a complementary notch in the lower flange member fastened to the lower part of the wheel;
- the protective or first enclosure includes manipulator means such as at least one glove connected in sealed manner to an opening in the first enclosure at least to move the transfer wheel manually between the transfer position and the retracted position from outside the first enclosure of the installation;
- the remote manipulator means include at least one glove extended by a cuff joined in sealed manner to an opening in the first enclosure, notably in one of the doors of the first enclosure adjacent the transfer wheel, in such a manner as to enable an operator to carry out, from outside the first enclosure, the manual operations required to move said at least part of the transfer wheel between the transfer position and the retracted position, so that the operator no longer enters the interior of the first area in which the transfer wheel and the container blower unit are placed;
- the installation includes at least one actuator for at least moving the transfer wheel automatically between the transfer position and the retracted position from outside the first enclosure of the installation.

BRIEF DESCRIPTION OF THE DRAWINGS

Other features and advantages of the invention will become apparent on reading the following description, given with reference to the appended drawings, in which:

FIG. 6 is a three-quarter front perspective view that shows the installation from the blower unit side and, adjacent the opening, its shutting off means in the open position and with the doors of the first enclosure omitted, and the transfer wheel provided with a flange comprising two parts mounted to pivot relative to each other to allow retraction of the upper part of the wheel which passes through the opening when in the operating position;

FIG. 7 is a perspective view that shows in detail the flange of the transfer wheel the upper and lower elements of which respectively connect the mobile upper part and the fixed lower part, the transfer wheel being in the first transfer position;

FIG. 10 is a plan view which, like FIG. 3, represents in detail the common part between the enclosures of the blower unit and the filler unit, including the opening, showing said opening closed by the associated shutting off means in the closed position.

DETAILED DESCRIPTION OF THE PREFERRED EMBODIMENTS

In the remainder of the description, similar or identical elements are designated by the same reference numbers.

In the description there are used by way of nonlimiting example expressions such as "upstream" and "downstream", "upper" and "lower", "interior" and "exterior", "front" and "rear" and longitudinal, vertical and transverse orientations as defined in the description and relative to the trihedra (L, V, T) represented in the figures.

Figure 1:
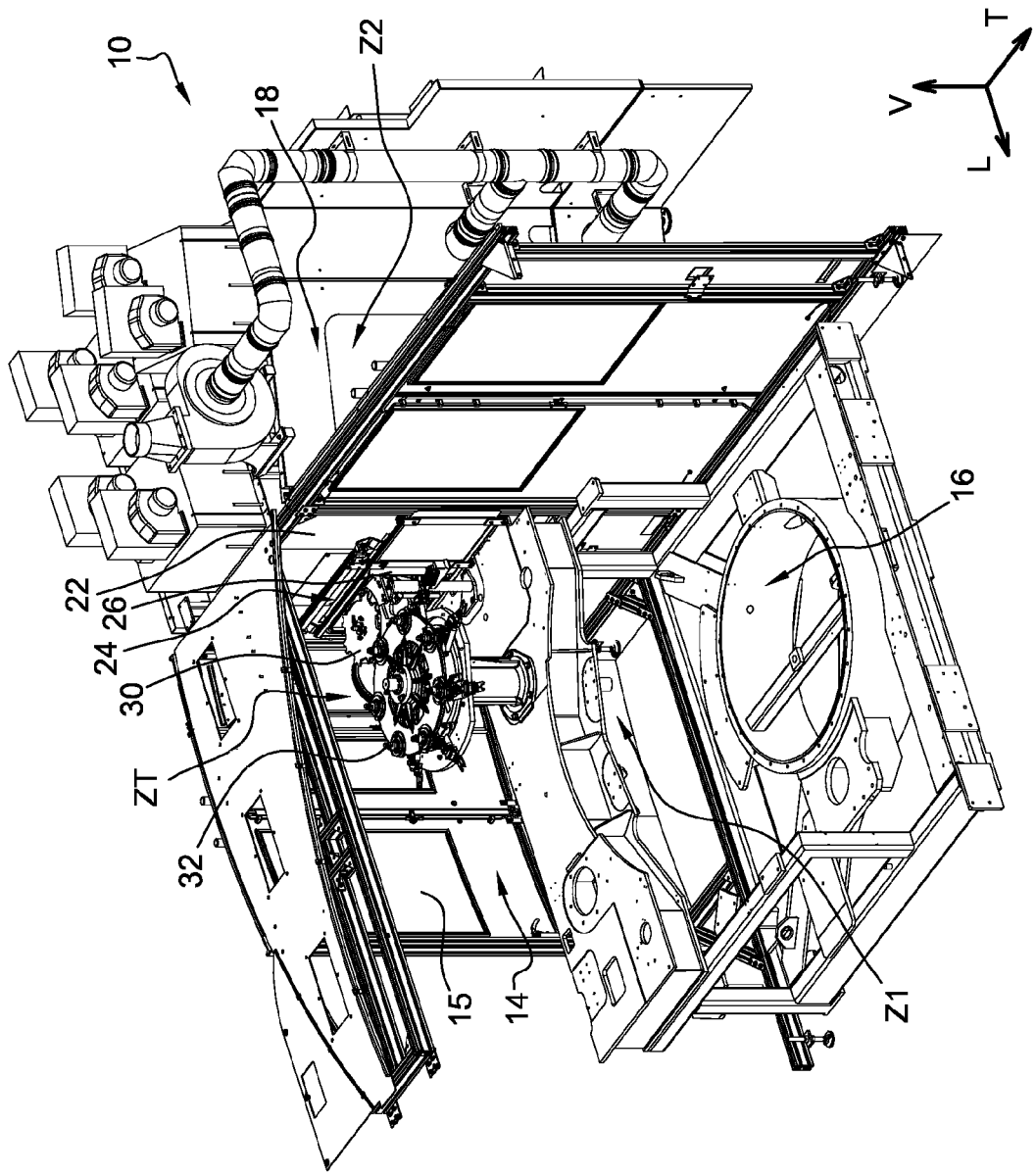
FIG. 1 is a partial three-quarter rear view in perspective that represents a container production installation of one embodiment of the invention and shows more particularly the common junction part between the enclosures of the blower unit and the filler unit in which an opening is provided for transferring the containers.

FIG. 1 represents an installation 10 of one embodiment of the invention for the production of containers 12, notably, but not exclusively, bottles, as shown partially in FIG. 6.

The installation 10 includes at least one protective or first enclosure 14 that delimits a first area Z1 inside which at least one blower unit 16 for blowing the containers 12 is placed.

The blower unit 16 is preferably adapted to produce the containers 12 by blowing or drawing-blowing preforms (not shown) that are heat treated beforehand in an oven (not shown), notably by heating them by means of infrared radiation lamps.

In known manner, such a blower unit 16 includes on the upstream side a heating oven for heat treating the preforms and transfer means (not shown) placed at its exit that are able to feed each of said heated preforms into one of the molds (not shown) at the periphery of a carousel (not shown) in order to proceed therein to its transformation into a container 12 by blowing or by drawing-blowing, depending on the application.

The installation 10 includes a confinement or second enclosure 18 which at least in part adjoins the first enclosure 14 via a common part 22 and delimits a sterile second area Z2 (see FIG. 2) inside which is placed at least one filler unit 20 for filling the containers 12 produced by the blower unit 16.

Each of the enclosures 14 and 18 consist of a set of vertical walls which, assembled together to form an overall parallelepiped, are closed at the top and at the bottom, for example by a wall forming a ceiling and by the floor, respectively.

At least one of the vertical walls of the enclosures 14 and 18 preferably includes doors enabling the enclosures to be entered, notably by an operator, to enable access to the interior of the installation 10.

Figure 3:
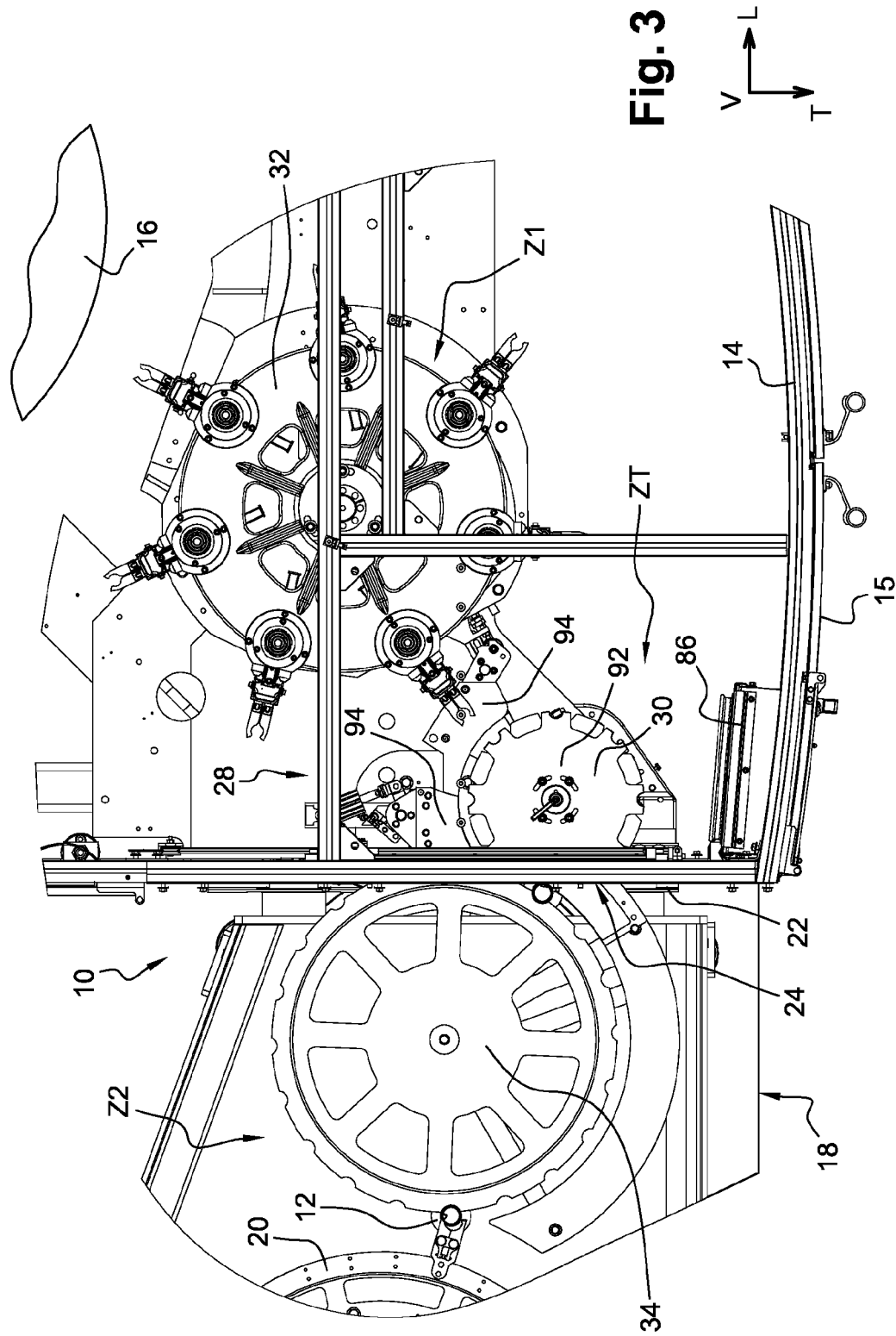
FIG. 3 is a plan view showing FIG. 2 in more detail and showing the common part between the enclosures, including in its open position the opening which in production mode is not shut off by the associated shutting off means.

For example, the first enclosure 14 includes at least two access doors 15 forming part of its front vertical wall and that can be seen more particularly in FIGS. 1 and 3.

Figure 4:
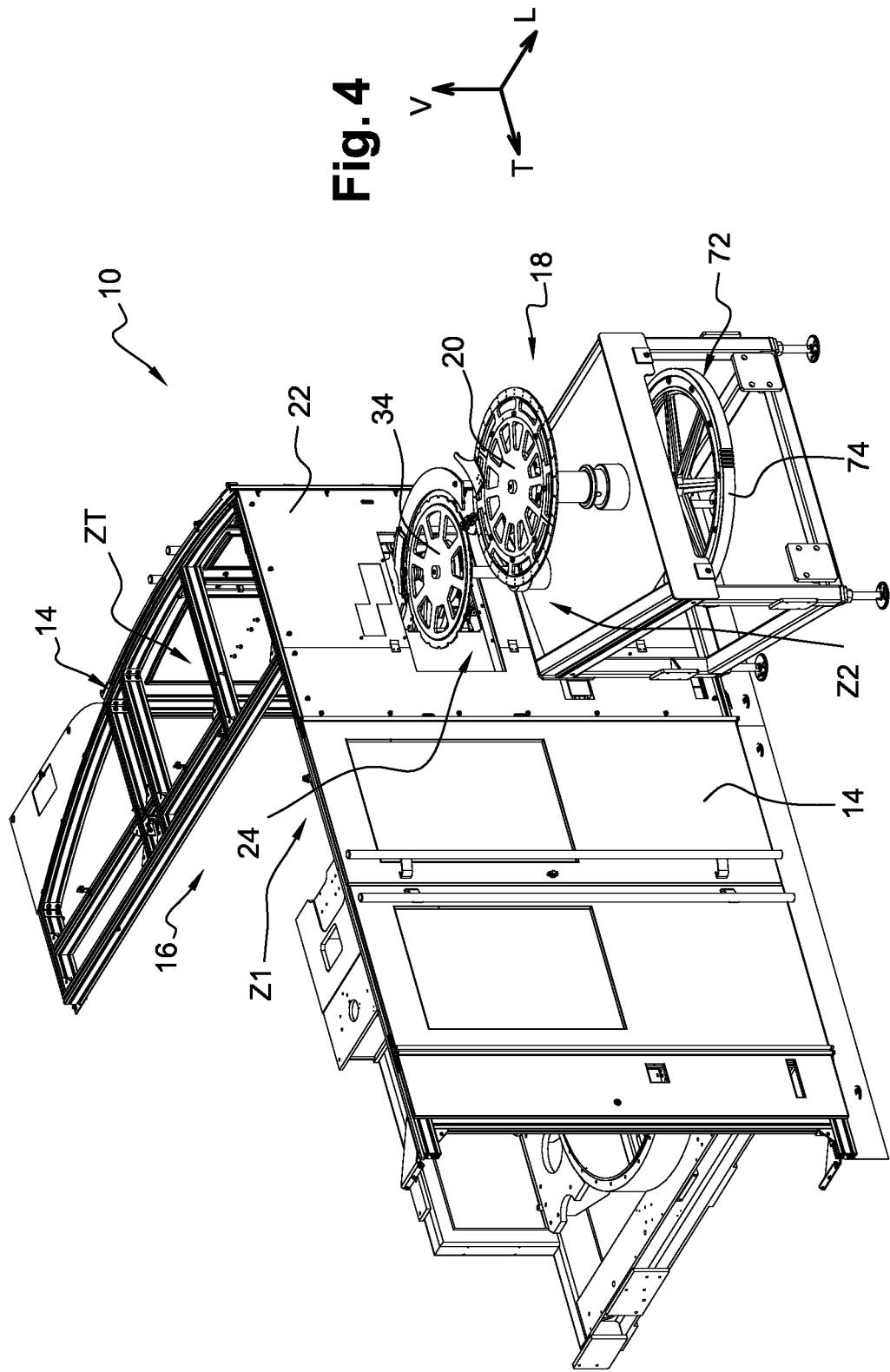
FIG. 4 is a three-quarter perspective view that shows the installation from the filler unit side, without the second enclosure, and the second transfer wheel that is associated with the filler unit and in production mode receives the containers passed through the opening by the retractable transfer wheel.
Figure 5:
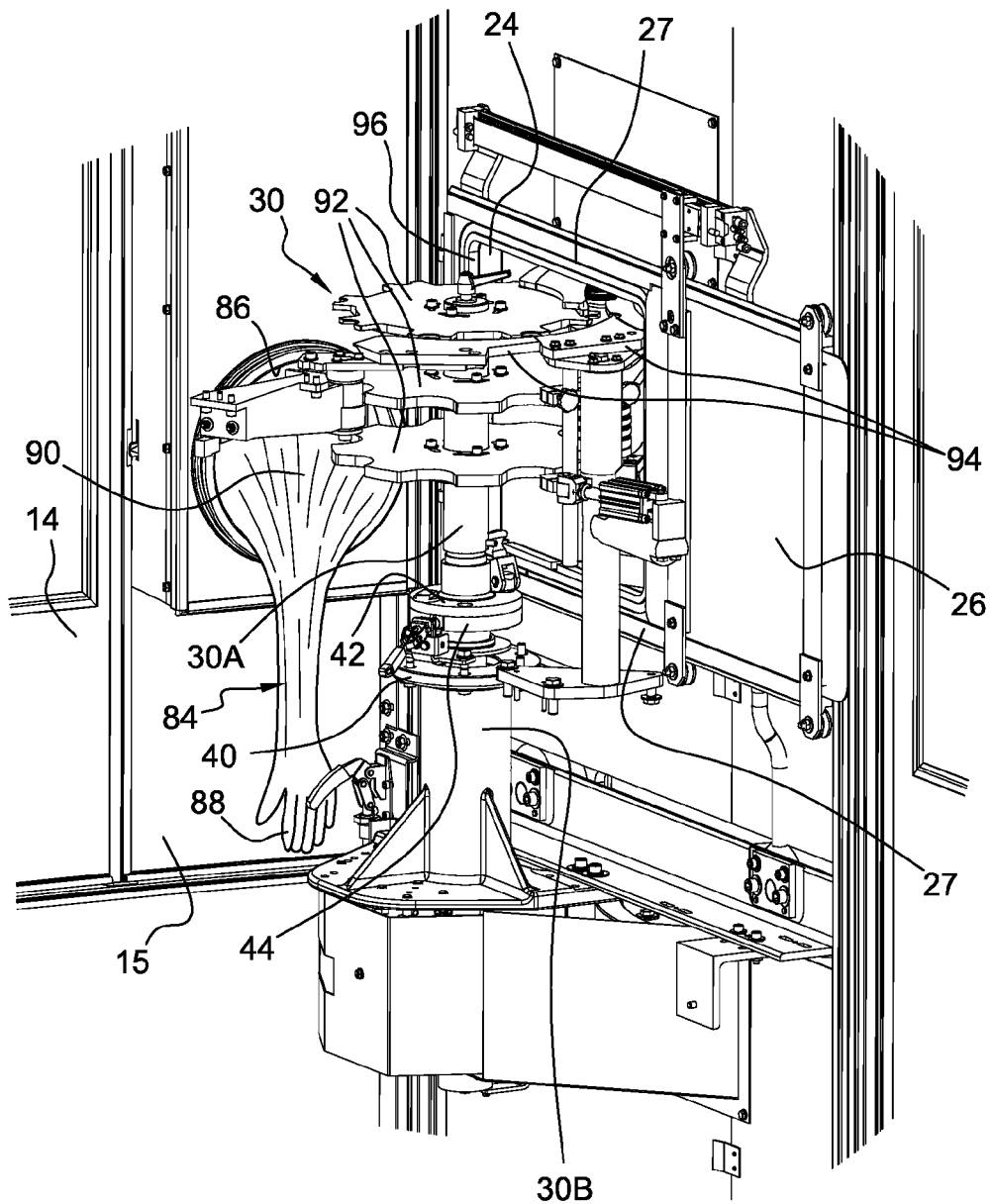
FIG. 5 is a three-quarter rear perspective view that shows the installation from the blower unit side and, adjacent the opening, its shutting off means in the open position, and the transfer wheel adapted to be retracted manually from outside the first enclosure by means of manipulator means connected and sealed to one of the doors.

As shown more particularly in FIGS. 3 to 5, the installation 10 includes at least one opening 24 in said common part 22 of the first and second enclosures 14 and 18.

The opening 24 is intended to allow transfer of the containers 12 from the blower unit 16 to the filler unit 20.

The installation 10 advantageously includes means 26 for shutting off said opening 24 adapted to be moved selectively between at least an open position and a closed position.

The open position is the position in which the shutting off means 26 allow transfer of the containers 12 through the common opening 24 when the installation 10 is in a production mode of operation.

The closed position is the position in which the shutting off means 26 prevent such transfer by isolating the second enclosure 18.

The closed position is in particular intended to allow operations for decontaminating the filler unit 20 to be carried out at least in the second enclosure 18 when the installation 10 is in a different, decontamination mode of operation.

The installation 10 preferably includes at least one actuator intended to drive the movement of the means 26 for shutting off the common opening 24, which slide between the open position corresponding to the production mode and the closed position corresponding to the decontamination mode.

The shutting off means 26 advantageously achieve in said closed position hermetic closure of the opening 24 adapted to isolate the second enclosure 18 containing the filler unit 20 from the first enclosure 14 containing the blower unit 16 for blowing the containers 12.

The means for shutting off the opening 24 advantageously comprise a flap 26 that is mounted to slide between said open and closed positions by means of two slideways 27, respectively an upper slideway and a lower slideway.

As shown in FIG. 5, for example, the slideways 27 of the flap 26 are fastened to the common part 22 and are respectively placed above and below the opening 24, which here has a globally rectangular shape.

Decontamination is preferably carried out chemically by spraying decontaminating solutions, such as sodium hydroxide (NaOH) or hydrogen peroxide ($H_2O_2$), inside the second enclosure 18.

The installation 10 includes a transfer device 28 for transferring containers 12 between the blower unit 16 and the filler unit 20.

The transfer device 28 includes at least one transfer wheel 30 adjacent the opening 24 in the common part 22 and intended to transfer containers 12 through said opening 24 in production mode.

Figure 2:
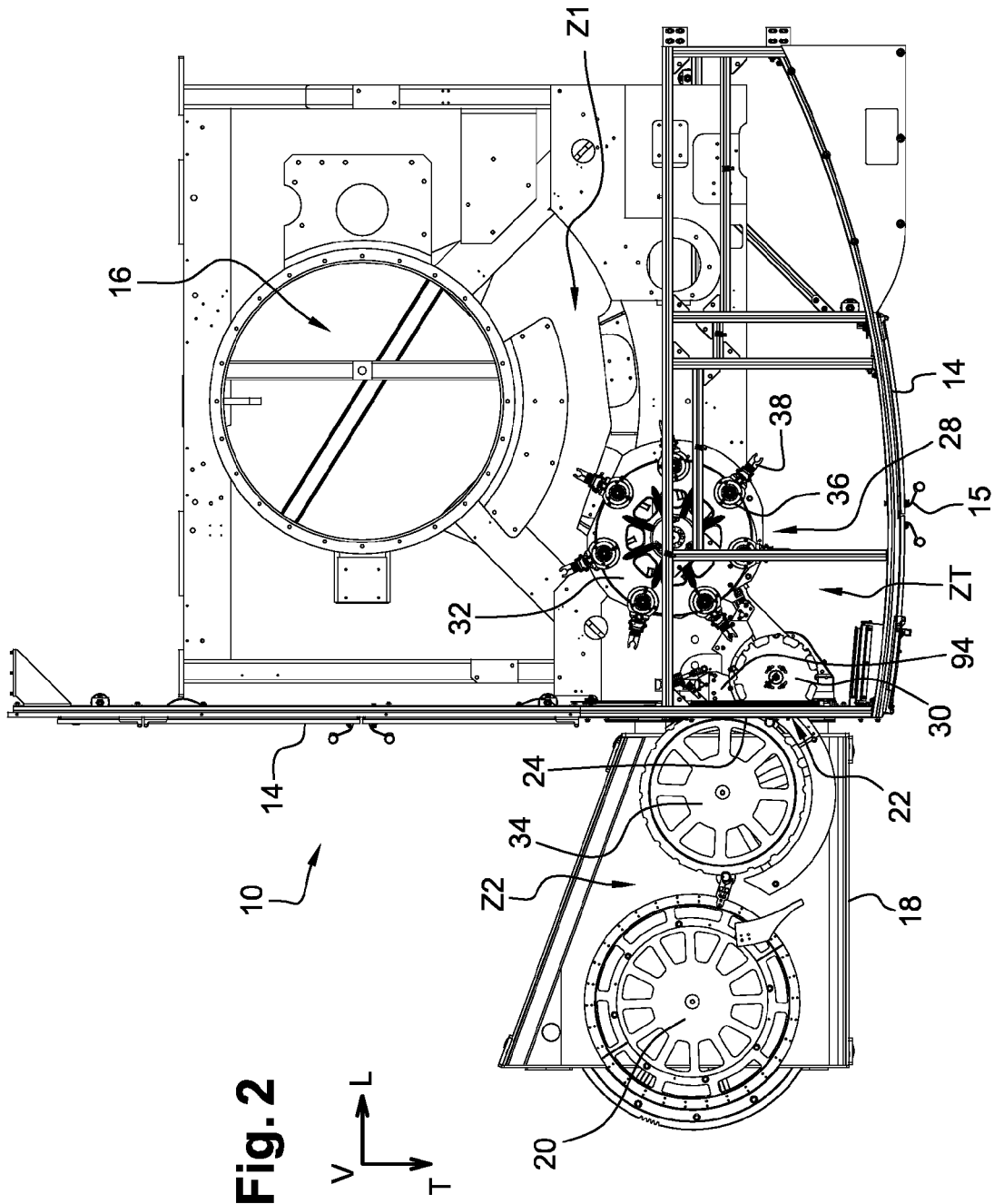
FIG. 2 is a plan view of the FIG. 1 installation and shows, adjacent the opening, the transfer wheel of the transfer device in the transfer position.

The transfer device 28 preferably includes in addition to the transfer wheel 30 two other transfer wheels 32 and 34 respectively placed upstream and downstream of the wheel 30, as shown in FIG. 2.

The wheels 30, 32, and 34 of the transfer device 28 are placed relative to each other so that each has a circular arc portion tangential to the portion of the adjacent wheel in order to determine an area in which containers 12 are transferred from one to the other.

The first transfer wheel 32 is placed between the entry of the transfer wheel 30 and an exit area of the carousel of the blower unit 16 in which the molds are opened to allow extraction of the containers produced by the associated blowing or drawing-blowing means.

The first transfer wheel 32 is intended to extract the fabricated containers 12 from the molds and to transfer them in the downstream direction, for example by means of transfer arms 36 provided at their free end with holding means 38 such as clamps.

The second transfer wheel 34 is placed downstream, between the exit of the transfer wheel 30 and another carousel of the filler unit 20, the stations for filling the containers 12 being regularly distributed circumferentially around said carousel.

As explained above, the object of the present invention is to propose for such an installation 10 a solution able in particular to eliminate the risks of contamination associated with the intervention of the operator.

To do this, the invention proposes to modify the installation in order to eliminate all physical presence of the operator inside the installation, here in the transfer area of the first area Z1 of the first enclosure 14, and as a corollary of this to eliminate the associated risks of contamination.

At least part of the transfer wheel 30 is therefore advantageously mounted to move between at least:
 a transfer or first position in which said at least one part of the wheel 30 extends through the common opening 24 to transfer containers 12 when the installation 10 is operating in production mode, and
 a retracted or second position in which said at least one part of the wheel 30 is moved to allow the common opening 24 to be closed by the associated shutting off means 26 with a view to operation of the installation in decontamination mode.

Preferably only that part of the transfer wheel 30 corresponding to the part extending through the opening 24 is mounted so as to be mobile.

Alternatively, the whole of the transfer wheel 30 is mounted so as to be mobile, for example being mounted on a carriage adapted to allow it to move between said transfer and retracted positions.

In such a variant the transfer wheel 30 advantageously has its own rotation drive means or the drive means are easy to disengage.

According to an important feature of the invention, the movement of the mobile part of the transfer wheel 30 between said transfer position and said retracted position is driven from outside the installation 10, to be more precise in this instance from outside the first enclosure 14 inside which the transfer wheel 30 is placed.

The retraction of part of the wheel 30 is consequently obtained without an operator having to open the doors 15 to enter the first enclosure 14 and physically to enter the transfer area ZT to work on the transfer wheel 30, with the advantageous result that the aforementioned risks of contamination are completely eliminated.

The transfer wheel 30 is preferably moved toward its retracted position to free the opening 24 manually by an operator from outside the installation 10.

Without total automation, intervention by the operator is therefore still required at least to carry out the operation of retracting at least the part of the transfer wheel 30 that is mounted so as to be mobile, and then, when the filler unit 20 has been decontaminated, the reverse operation to return said part into its initial transfer position with a view to operation of the installation 10 in production mode.

The transfer wheel 30 preferably includes a flange 40 including an upper flange element 42 and a lower flange element 44 respectively fastened to an upper part 30A and a lower part 30B of the wheel.

The flange elements 42, 44 are advantageously interconnected at least by articulation means 46, as shown in FIG. 7 in particular.

The articulation means 46 are in particular adapted to allow movement of the upper part 30A of the wheel which, in the transfer position, is the only part of the transfer wheel 30 that extends through the opening 24.

Accordingly, thanks to the flange 40 said upper part 30A forms a part mobile relative to the lower part 30B of the wheel, which here constitutes a fixed part.

The upper part 30A of the transfer wheel 30 therefore constitutes said at least one wheel part that is mounted to be mobile between the transfer position and the retracted position.

The articulation means 46 preferably consist of a pivot 48 defining a pivot axis A about which the upper flange element 42 pivots relative to the lower flange element 44 with a gyratory movement corresponding to the travel of the mobile upper part 30A of the wheel between said transfer and retracted positions.

The pivot axis A formed by the pivot 48 extends vertically and coaxially with the main rotation axis of the wheel 30.

In the transfer position, the axes of the upper and lower parts 30A and 30B are coincident and globally determine the main axis of rotation of the wheel 30, which is no longer the case in the retracted position in which the upper part 30A is offset relative to the fixed lower part 30B.

The transfer wheel 30 advantageously includes locking means 50 adapted to immobilize the upper part 30A relative to the lower part 30B of the wheel in the transfer position or the retracted position.

The locking means 50 of the wheel 30 preferably consist of at least one pin 52 adapted to be selectively introduced at least into a two-part first housing 54 which extends vertically through the upper and lower elements 42 and 44 of the flange 40.

When the pin 52 is inserted vertically into the first housing 54, the pin 52 then immobilizes the upper part 30A and the lower part 30B of the transfer wheel 30 in a particular position that corresponds to said transfer position of the wheel 30.

The locking means 50 of the wheel 30 consisting of the pin 52 are preferably adapted to be introduced selectively at least into a second housing 56 in which the pin 52 immobilizes the upper part 30A and the lower part 30B of the wheel 30 in a particular position that corresponds to said retracted position of the wheel 30.

The two-part second housing 56 extends vertically through the upper element 42 and the lower element 44 of the flange 40.

Thus the flange 40 includes the first housing 54 and the second housing 56 which are produced, for example by drilling, through the upper element 42 and the lower element 44 of the flange 40.

The locking means 50 formed by the pin 52 advantageously have a lower locking end adapted to be introduced into the first housing 54 or the second housing 56 and an upper end that is connected to an operating member 58.

The operating member 58 of the locking pin 52 includes for example a handle 60 articulated about a rotation axis B that is orthogonal to the main axis of the pin 52 that is vertically oriented when it is in the locking position in one of the housings 54 or 56.

The handle 60 forming the operating member 58 includes, for its articulated connection with the pin 52, two flanges 62 that extend on respective opposite sides of the upper end of the pin 52 and each of which has a lower edge 64.

The lower edge 64 of each flange 62 has a profile that is intended to cooperate with a facing part of the horizontal upper face 66 of the upper element 42 of the flange 40.

The cooperating shapes of the edge 64 of each flange 62 and the face 66 of the upper flange element 42 advantageously facilitate, during operations that move the transfer wheel 30, extraction of the pin 52 from the housing 54 or 56, which is effected with the assistance of a lever effect.

Thus, for the operator intervening from outside the installation 10, the handle 60 also facilitates maneuvering the locking pin 52 between the first and second housings 54 and 56.

The installation 10 preferably includes abutment means 68 which, cooperating with part of the upper flange element 42, determine the position of the mobile upper part 30A when the wheel 30 occupies said retracted position.

The abutment means 68 are advantageously adjustable by means of a screw and nut system in order to adjust their position precisely.

Figure 9:
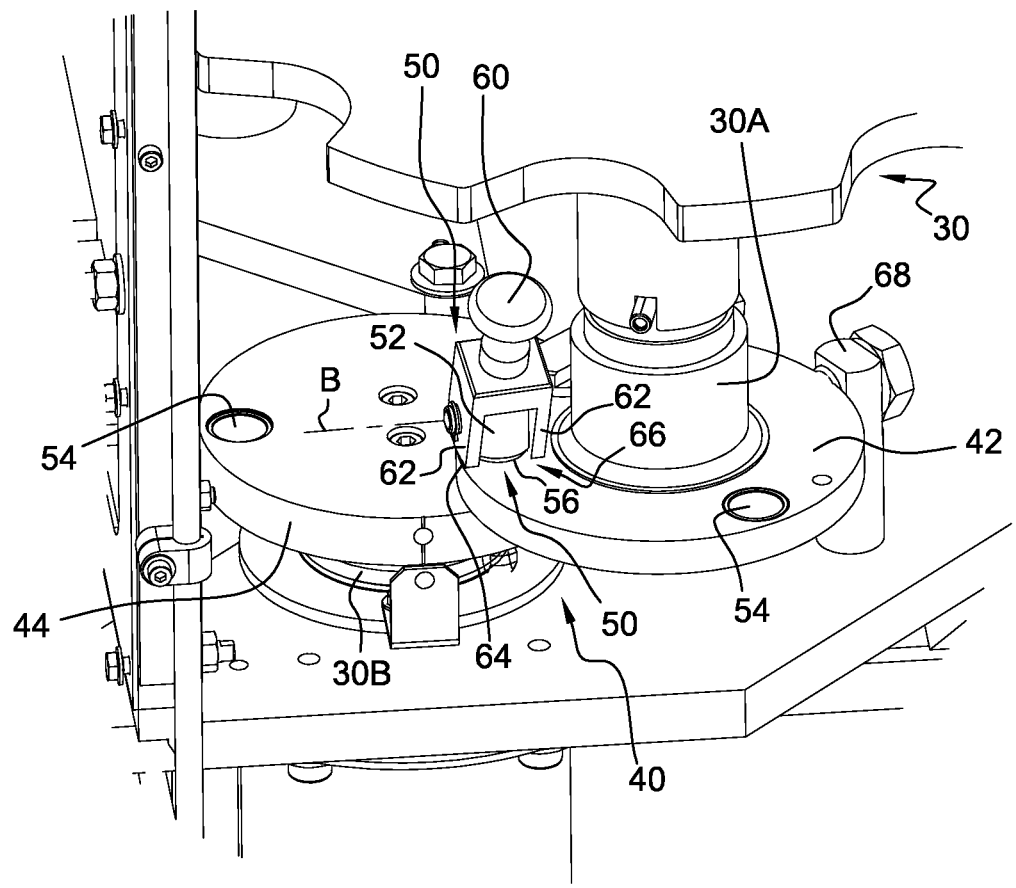
FIG. 9 is a perspective view that shows in detail the flange of the transfer wheel in the retracted position and the pin forming the locking means in position in the second housing to lock the upper flange member in position relative to the lower flange member.

The abutment means 68 also guarantee correct vertical alignment of the two parts of the drilled hole forming the second housing 56 and so the means 68 also facilitate introduction of the locking pin 52 into the second housing 56, corresponding to locking the transfer wheel 30 in the retracted position, as shown in FIG. 9.

The transfer wheel 30 preferably includes immobilizing means 70 that are adapted selectively to immobilize the lower part 44 of the wheel 30 against rotation relative to the means 72 for driving rotation of the transfer wheel 30 when the installation is in production mode.

The drive means 72 of the transfer wheel 30 consist for example of means for driving rotation at least of the wheel of the filler unit 20 so as to ensure synchronous driving and include to this end at least one motor and motion transmission means such as belts.

The drive means 72 are preferably placed in the lower part of the installation 10, the transfer wheel 30 including a rotation drive shaft which, forming most of the lower part 30B, is connected by a belt (not shown) to a drive wheel 74 of the filler unit 20 (see FIG. 4).

The rotation immobilizing means 70 consist for example of at least one finger 76 that is received in a complementary notch 78 in the lower flange element 44 fastened to the lower part 30B of the wheel.

The locking means 70 are advantageously mounted so as to be mobile between at least an active position in which the finger 76 enters the notch 78 in order to immobilize it against rotation and a passive position in which the finger 76 is retracted from the notch 78.

The finger 76 is preferably mounted so as to be mobile between said active and passive positions with a forward or reverse rectilinear movement.

Sliding of the finger 76 is advantageously driven via a handle 80 connected to the finger 76 by connecting means 82 adapted to transmit forces applied to the handle 80 to move the finger 76 between said positions.

In this embodiment, the handle 80 is mounted so as to be mobile in rotation between a low position (FIG. 7) corresponding to the passive position of the immobilizing means 70 and a high position corresponding to their active position.

Thanks to the connecting means 82, actuating the handle 80 between said high and low positions therefore causes movement of the finger 76 into or out of the notch 78 so that immobilization by insertion of the finger 76 into the notch 78 is obtained by raising the handle from its low position to its high position and, conversely, release is obtained by lowering the handle 80 from its high position to its low position.

The immobilizing means 70 make it possible to cancel out residual torque produced by the drive means 72, which nevertheless remain in a position to drive rotation at low speed of the wheel of the filler unit 20 when operating in decontamination mode.

The first enclosure 14 for protecting the installation 10 advantageously includes manipulator means 84 adapted to enable remote manipulation by an operator and without direct contact of the operator with the manipulated members, from which the operator, working from outside the first enclosure 14, is isolated by said manipulator means 84.

The manipulator means 84 preferably consist of at least one glove 88 extended by a cuff 90 shown in detail in FIG. 5.

One of the doors 15 of the first enclosure 14 advantageously includes an opening 86 on which the end of the cuff 90 opposite the glove 88 is mounted in sealed manner.

The manipulator means 84 are thus advantageously integrated into a front wall portion of the enclosure 14 near the transfer wheel 30 to enable an operator outside the protective first enclosure 14 to carry out the manipulations required to move the transfer wheel 30 between the transfer position and the retracted position.

The operator advantageously acts remotely from outside without ever entering the first area Z1 in which the transfer wheel 30 and the blower unit 16 for the containers 12 are placed, in particular the transfer area ZT of said first area Z1 in which the transfer wheel 30 is placed and which is directly adjacent the opening 24.

Only part of at least one of its arms preferably enters the first enclosure 14 via the glove 88-90 forming the manipulator means 84 and by means of which the operator intervenes remotely without ever being able to constitute a vector for the introduction of pathogens.

Although at least one arm of the operator "enters" the enclosure 14, the fact that said at least one manipulator glove 88 is connected in sealed manner to the door 15 of the first enclosure 14 has the consequence that manipulation is effected without direct physical contact with the operator because of the interposition of the glove 88 that isolates the operator.

In the absence of any contact of the operator, for example their skin, with the elements manipulated, or simply of their body with the air inside the first area Z1, the totally isolated operator is no longer liable to constitute a vector for introducing pathogens into the interior of the installation 10, and more particularly for introducing pathogens directly or indirectly into the interior of the sterile second area Z2 of the filler unit 20.

The locking means 50 and the immobilizing means 70 are advantageously easily maneuvered manually by the operator via the first enclosure 14 by means of the glove 88-90 forming the remote manipulator means 84, with no risk of contamination.

Thanks to the invention, the operations of demounting the means 92 for holding the containers 12 during transfer by the transfer wheel 30 that were previously necessary are eliminated, said means 92 consisting in the example represented in the figures of the three superposed plates each provided circumferentially with notches intended to cooperate in known manner with part of the container 12.

Such holding means 92 are preferably associated with first guide means 94 which are also mounted to be mobile between two positions, a working position and a retracted position, when they extend through the opening 24 in production mode.

Retraction of the first guide means 94 of the containers during transfer from the wheel 30 to the wheel 34 is preferably driven automatically by means of at least one actuator such as a piston-and-cylinder actuator.

The installation 10 further includes second guide means 94 placed between the first transfer wheel 32 and the transfer wheel 30, said second guide means 94 also being mounted so as to be mobile between a working position and a retracted position.

The second guide means 94 are preferably retracted automatically by means of at least one actuator so as not to interfere with the retraction of the transfer wheel 30.

The operations to be effected by the operator to close the opening 24 by means of the flap 26 are therefore advantageously simplified as they consist mainly in causing the mobile upper part 30A of the transfer wheel 30 to pivot and then either replacing the locking means 50 or actuating the immobilizing means 70.

In addition to eliminating the risks of contamination by the operator, the invention also makes it possible in an installation 10 equipped with such a transfer wheel 30 to proceed rapidly to closing the opening 24 intended hermetically to isolate the filler unit 20 and thus makes possible a shorter intervention time before going to the decontamination mode.

In the case of the preceding embodiment in which retraction is driven manually by an operator, there are described next various successive operations carried out to go to decontamination mode following operation in production mode, followed by the reverse operations to revert to operation of the installation 10 in production mode.

As shown in FIGS. 1 to 7, the installation 10 is able to operate in production mode in which the blower unit 16 transforms previously heat treated preforms by blowing or by drawing-blowing into as many containers 12 that are successively transferred by the wheels 30, 32 and 34 from the transfer device 28 to the filler unit 20 where the containers 12 are filled and advantageously capped.

In production mode, the transfer wheel 30 occupies its transfer position in which the holding means 92 for the containers 12 on the upper part 30A of the wheel 30 extend horizontally through the opening 24, which here is in a transversely oriented vertical plane.

The shutting off means 26 formed by the flap occupy their open position with the result that the containers 12 may be transferred by the holding means 92 of the transfer wheel 30.

When it is required to change the mode of operation to the mode for decontaminating the filler unit 20, the installation 10 is stopped and so production of the containers 12 ceases.

The operator then intervenes to carry out the various operations preceding operation in decontamination mode.

The operator must retract at least the part 30A of the transfer wheel 30 and close the opening 24 by means of the flap 26, all of these operations or maneuvers being effected from outside the first enclosure 14 without the operator having to enter said enclosure 14.

The operator first disengages the rotational drive means 72 from the transfer wheel 30 so that the wheel is free to turn upon itself, disengagement being obtained for example from outside by means of a control console and means automatically controlling a pneumatic clutch.

The operator then immobilizes the lower flange element 44 against rotation by means of the immobilizing means 70.

To do this, the operator passes at least one hand through the opening 86 in the door 15 of the first enclosure 14 in order to introduce it into the remote manipulator means 84 formed here by at least one glove 88 that extends the cuff 90 connected in sealed manner to the opening 86.

The operator then stands outside the installation 10, to be more precise in front of the door 15 incorporating the opening 86, and is able to actuate the handle 80 of the immobilizing means 70 manually, raising said handle 80 to its high position in order to bring about simultaneous movement of the finger 76 from its passive position to its active position, in which the finger 76 is introduced into the notch 78 of the lower element 44 of the flange 40.

The operator then grasps the handle 60 of the locking means 50 and pivots it to extract the pin 52 from the first housing 54 that extends vertically through the upper element 42 and the lower element 44 of the flange 40.

The pin 52 is preferably then introduced immediately into the upper part of the second housing 56 of the upper element 42 of the flange 40.

Alternatively, attachment means, such as a chain, attach the locking means 50 to part of the wheel 30 or the flange 40 so that they cannot be lost or dropped while manipulating them and so that the operator is always able to grasp them with the glove 88.

The upper element 42 and the lower element 44 of the flange are then no longer locked together and are connected only by the pivot 48 forming the articulation means 46.

Figure 8:
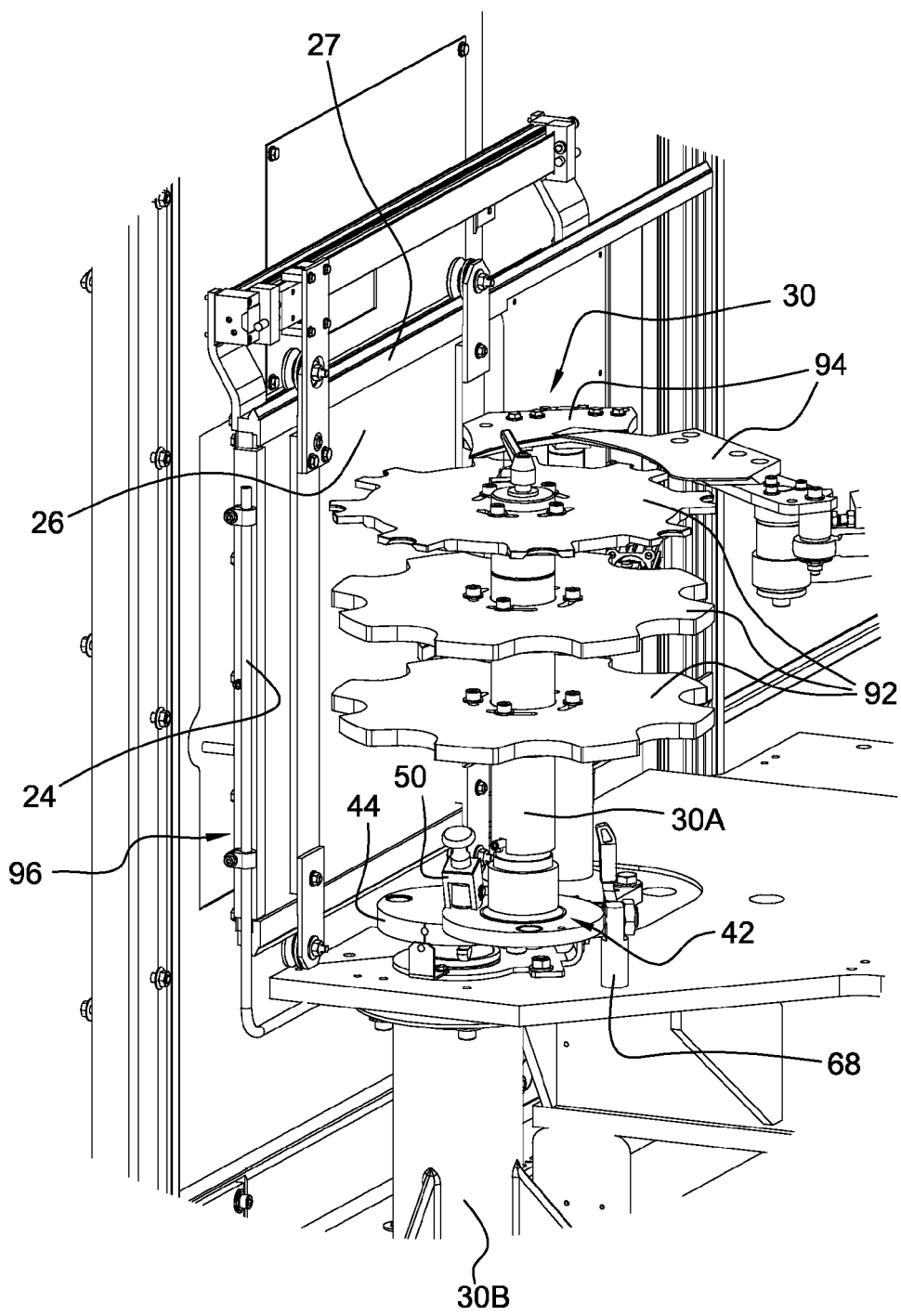
FIG. 8 is a perspective view that shows, from the front of the installation and with the doors of the first enclosure omitted, the transfer wheel in the second or retracted position and the opening closed by the shutting off means in the closed position.

The operator is then able to move the mobile upper part 30A of the wheel to cause it to effect a gyratory movement about the vertical pivot axis A, thus moving from the transfer position shown in FIGS. 6 and 7 to the retracted position shown in FIGS. 8 and 9.

The operator is in particular advised that the upper part 30A of the transfer wheel 30 has reached said retracted position when they feel a resistance force, the upper element 42 of the flange 40 coming into contact with abutment means 68 provided for this purpose.

With the mobile upper part 30A of the transfer wheel 30 occupying said retracted position, the operator is able to lock the flange 40 of the wheel 30 by introducing the pin 52 of the locking means 50 into the second housing 56, as shown in FIG. 9.

The abutment means 68 are advantageously adjustable so as to allow precise adjustment of each installation 10 and transfer wheel 30, guaranteeing correct positioning in the retracted position and ensuring perfect vertical alignment of the two drilled holes in the upper element 42 and the lower element 44 that together form the second housing 56.

In FIG. 9, the pin 52 is in its locking position in the second housing 56 and there are seen in the upper element 42 and the lower element 44 the two angularly parts offset which form the first housing 54.

The operator also retracts the first and second guide means 94 for the containers 12 associated with the holding means 92, this retraction advantageously being obtained automatically by means of actuators that are controlled from outside the installation 10 by the operator.

The upper part 30A of the transfer wheel 30 and the guide means 94 being in their respective retracted positions, the opening 24 can be shut off in sealed manner by the flap 26 in order to decontaminate the filler unit 20.

To complete these operations, the operator commands, for example from a console, automatic closing of the flap 26, which is advantageously moved transversely toward the front by actuators from its open position to its position closing the opening 24.

The installation 10 advantageously includes around the opening 24 sealing means 96 for enhancing the shutting off of the opening 24 and guaranteeing sealed closure.

In the closed position of the flap 26, the sealing means 96 are disposed between the edges of the opening 24 in the wall 22 and the perimeter of the flap 26.

The sealing means 96 advantageously consist of one or more seals adapted to be inflated to ensure hermetic closure of the opening 24.

Following operation in decontamination mode, the operator executes in reverse order the same manipulations and commands as just described, in order to reposition all of the members in the initial position that they occupied beforehand, corresponding to operation of the installation 10 in production mode.

In an embodiment that is not shown, the installation 10 includes at least one remote-controlled actuator adapted to move automatically the upper part 30A forming the part of the transfer wheel 30 that is mounted to be mobile between the transfer position and the retracted position.

Of course, compared to the embodiment described previously, all the maneuvers effected manually by an operator can be automated, notably by means of appropriate actuators.

The locking means 50 are for example advantageously integrated into an actuator driving pivoting of the upper flange element 42 and lower flange element 44, which actuator is operated selectively to achieve the retraction of the mobile upper part 30A of the transfer wheel 30.

Such selective operation of the actuator or actuators is either entirely automated or controlled by an operator via man/machine interfaces such as a control console disposed outside the installation 10.

Similarly, the control handle 80 of the rotation immobilizing means 70 can for example be replaced by an actuator adapted to drive selectively the movement of the finger 76 relative to the notch 78.

Thus the invention is in no way limited to the embodiment described and represented in which the operations are effected manually by an operator.

The invention is advantageously adapted to be used in an existing installation 10 by proceeding to the necessary modifications of the transfer wheel 30, in particular to introduce the flange 40 by means of which the upper part 30A is retractable from outside the installation 10.

The present invention is considered susceptible of industrial application and more particular susceptible to be used in an installation 10 for the production of containers 12 including a container transfer wheel 30 between a first enclosure 14 including a blower unit 16 and a second enclosure 18 including a filler unit, said wheel 30 being mounted so as to be mobile between at least:
 a transfer position in which the wheel extends through an opening 24 common to the enclosures 14, 18 to transfer the containers 12, and
 a retracted position in which the wheel is moved to allow closing of the opening 24 by associated shutting off means 26 for decontaminating the second enclosure 18, and in which the movement of said transfer wheel 30 between said positions is driven manually or automatically from outside the first enclosure 14 and/or the second enclosure 18 of the installation 10.

The invention claimed is:

1. An installation (10) for the production of containers (12), comprising:
 a protective or first enclosure (14) delimiting a first area (Z1) inside which is placed at least one container blower unit (16);
 a confinement or second enclosure (18) which at least in part adjoins the first enclosure (14) via a common part (22) and delimits a sterile second area (Z2) inside which is placed at least one filler unit (20) for filling the finished containers (12);
 at least one opening (24) in said common part (22) of said first and second enclosures (14, 18) adapted to allow the transfer of containers (12) from the blower unit (16) to the filler unit (20);
 means (26) for shutting off said opening (24) adapted to be moved selectively between an open position in which the shutting off means (26) allow said transfer of containers (12) through the common opening (24) and a closed position in which the shutting off means prevent transfer by isolating the second enclosure in order to decontaminate the filler unit; and
 at least one transfer device (28) including at least one transfer wheel (30) adjacent said opening (24) adapted to transfer containers (12) between the blower unit (16) and the filler unit (20),
 wherein at least one part (30A) of the transfer wheel (30) is mounted to be mobile between at least:
  a transfer or first position in which said at least one part (30A) of the wheel extends through the opening (24) to transfer containers (12) during operation of the installation (10) in a production mode, and
  a retracted or second position in which said at least one part (30A) of the wheel is moved to allow closing of the opening (24) by the associated shutting off means (26) for operation of the installation in decontamination mode,
 the movement of said mobile part (30A) of the transfer wheel (30) between said transfer position and said retracted position being driven from outside the installation (10), and
 wherein the transfer wheel (30) includes a flange (40) including at least an upper flange element (42) and a lower flange element (44) respectively fastened to an upper part (30A) and a lower part (30B) of the wheel (30), said flange elements (42, 44) being connected at least by articulation means (46) adapted to allow movement between the transfer position and the retracted position of the upper part (30A) of the wheel (30) forming said part mobile relative to the lower part (30B) of the wheel (30) forming a fixed part.

2. The installation (10) according to claim 1, wherein the articulation means (46) consist of a pivot (48) defining a pivot axis (A) about which the upper flange element (42) pivots relative to the lower flange element (44) with a gyratory movement corresponding to the travel of the mobile upper part (30A) of the wheel (30) between said transfer position and said retracted position.

3. The installation (10) according to claim 1, wherein the transfer wheel (30) includes locking means (50) adapted to immobilize the upper part (30A) of the wheel relative to the lower part (30B) respectively in the transfer position and in the retracted position.

4. The installation (10) according to claim 3, wherein the locking means (50) consist of at least one pin (52) adapted to be introduced selectively into a first housing (54) extending through the upper element (42) and the lower element (44) of the flange (40) in which the pin (52) immobilizes the upper part (30A) and the lower part (30B) of the wheel in a particular position corresponding to the transfer position or into a second housing (56) extending through the upper element

(42) and the lower element (44) of the flange (40) in which the pin (52) immobilizes the upper part (30A) and the lower part (30B) of the wheel in another particular position corresponding to the retracted position of the transfer wheel (30).

5. The installation (10) according to claim 4, further comprising:
   abutment means (68) which are adapted to cooperate with part of the upper flange element (42) to determine the position of the mobile upper part (30A) of the wheel (30) in said retracted position, notably to facilitate introduction of the locking pin (52) into the second housing (56).

6. The installation (10) according to claim 1, wherein the transfer wheel (30) includes immobilizing means (70) adapted selectively to immobilize the fixed lower part (30B) of the wheel (30) against rotation relative to the means (72) for driving the transfer wheel (30) in rotation when the installation (10) is in decontamination mode.

7. The installation (10) according to claim 6, wherein the rotation immobilizing means (70) consist of at least one finger (76) that is received in a complementary notch (78) in the lower flange member (44) fastened to the lower part (30B) of the wheel.

8. The installation (10) according to claim 1, wherein the protective or first enclosure (14) includes manipulator means (84) such as at least one glove (88, 90) connected in sealed manner to an opening (86) in the first enclosure (14) at least to move the transfer wheel (30) manually between the transfer position and the retracted position from outside the first enclosure (14) of the installation (10).

9. The installation (10) according to claim 1, further comprising:
   at least one actuator at least for moving the transfer wheel (30) automatically between the transfer position and the retracted position from outside the first enclosure (14) of the installation (10).

10. The installation (10) according to claim 2, wherein the transfer wheel (30) includes locking means (50) adapted to immobilize the upper part (30A) of the wheel relative to the lower part (30B) respectively in the transfer position and in the retracted position.

11. The installation (10) according to claim 10, wherein the locking means (50) consist of at least one pin (52) adapted to be introduced selectively into a first housing (54) extending through the upper element (42) and the lower element (44) of the flange (40) in which the pin (52) immobilizes the upper part (30A) and the lower part (30B) of the wheel in a particular position corresponding to the transfer position or into a second housing (56) extending through the upper element (42) and the lower element (44) of the flange (40) in which the pin (52) immobilizes the upper part (30A) and the lower part (30B) of the wheel in another particular position corresponding to the retracted position of the transfer wheel (30).

12. The installation (10) according to claim 11, further comprising:
   abutment means (68) which are adapted to cooperate with part of the upper flange element (42) to determine the position of the mobile upper part (30A) of the wheel (30) in said retracted position, notably to facilitate introduction of the locking pin (52) into the second housing (56).

* * * * *